(12) United States Patent
Diab et al.

(10) Patent No.: US 8,812,884 B2
(45) Date of Patent: Aug. 19, 2014

(54) SYSTEM AND METHOD FOR USER DRIVEN CONFIGURATION SETS FOR ENERGY EFFICIENT NETWORKS

(75) Inventors: Wael William Diab, San Francisco, CA (US); Benjamin Gale, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 272 days.

(21) Appl. No.: 13/336,035

(22) Filed: Dec. 23, 2011

(65) Prior Publication Data

US 2013/0166898 A1 Jun. 27, 2013

(51) Int. Cl.
*G06F 1/32* (2006.01)
(52) U.S. Cl.
CPC .................... *G06F 1/3206* (2013.01)
USPC ........... 713/310; 713/100; 713/320; 713/323; 713/324
(58) Field of Classification Search
CPC ..................................... G06F 1/3206
USPC .................. 713/100, 320, 323, 324
See application file for complete search history.

(56) References Cited

U.S. PATENT DOCUMENTS

| | | | |
|---|---|---|---|
| 2003/0231368 A1* | 12/2003 | Nelson et al. | 358/539 |
| 2007/0162773 A1* | 7/2007 | Krantz et al. | 713/300 |
| 2009/0086764 A1* | 4/2009 | Lee et al. | 370/503 |
| 2010/0115308 A1* | 5/2010 | Iino et al. | 713/320 |
| 2010/0293404 A1 | 11/2010 | Diab | |
| 2011/0035498 A1* | 2/2011 | Shah et al. | 709/226 |
| 2011/0161522 A1 | 6/2011 | Diab | |
| 2011/0185202 A1* | 7/2011 | Black et al. | 713/320 |
| 2012/0254851 A1 | 10/2012 | Diab | |
| 2012/0287829 A1* | 11/2012 | Chang et al. | 370/296 |
| 2013/0042125 A1* | 2/2013 | Pearse et al. | 713/320 |

* cited by examiner

*Primary Examiner* — Vincent Tran
(74) *Attorney, Agent, or Firm* — Duane S. Kobayashi

(57) ABSTRACT

A system and method for user driven configuration sets for energy efficient networks. A customization module can be used to generate energy efficiency control policy customizations based on indications of user preference received through a graphical user interface. These customizations enable abstraction of the energy efficiency control policy customization process from low-level details.

16 Claims, 4 Drawing Sheets

SYSTEM AND METHOD FOR USER DRIVEN CONFIGURATION SETS FOR ENERGY EFFICIENT NETWORKS

BACKGROUND

1. Field of the Invention

The present invention relates generally to energy efficient networks and, more particularly, to a system and method for user driven configuration sets for energy efficient networks.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

In designing an energy efficient solution, one of the considerations is network link utilization. For example, many network links are typically in an idle state between sporadic bursts of data traffic. An additional consideration for an energy efficient solution is the extent to which the traffic is sensitive to buffering and latency. For example, some traffic patterns (e.g., HPC cluster or high-end 24-hr data center) are very sensitive to latency such that buffering would be problematic.

The application itself can also be a significant consideration. For example, one level of analysis can consider whether the application is a home network, service provider, enterprise, or a data center. The analysis can go deeper still by examining scenarios such as the type of network element within a given application. For example, the analysis can consider whether it is a gateway or a switch in a home network, or can consider whether it is a wiring closet or aggregation point in an enterprise network. The particular use of the network element can also be considered, such as whether it is an audio-video bridging switch for the home running a streaming application.

Implementation of various solutions in various applications is based on an energy efficiency control policy. What is needed is an energy efficiency control policy solution that can be easily tailored to the needs of a particular installation.

SUMMARY

A system and/or method for user driven configuration sets for energy efficient networks, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy efficient networks often attempt to save power when the traffic utilization of a network link is at a low level. This serves to minimize the performance impact while maximizing power savings. At a broad level, the energy efficiency control policy for a particular link in the network determines when to enter an energy saving state, what energy saving state (i.e., level of energy savings) to enter, how long to remain in that energy saving state, what energy saving state to transition to out of the previous energy saving state, etc. In one example, the energy efficiency control policy can base these decisions on a combination of static settings established by an IT manager and the properties of the traffic on the link itself.

Figure 1:
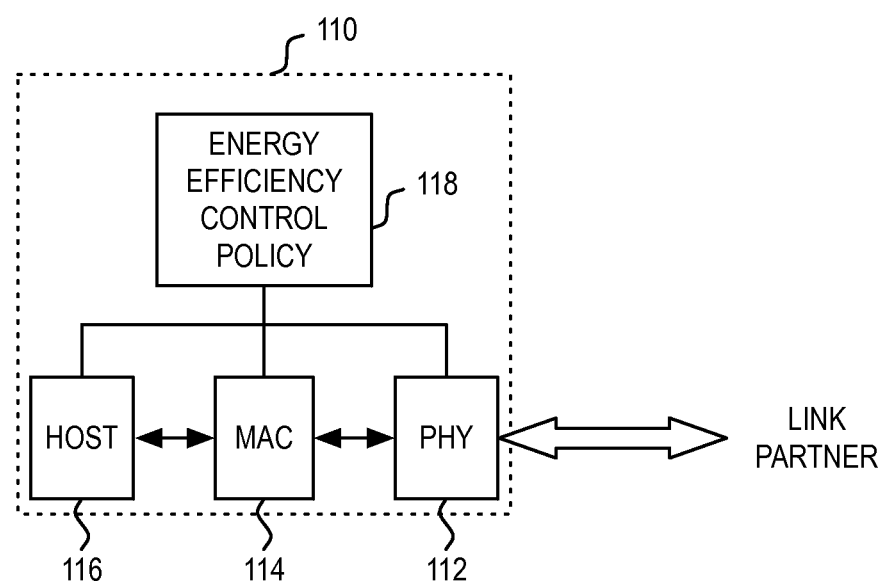
FIG. 1 illustrates an example of an energy efficiency control policy implemented in a network device.

FIG. 1 illustrates an example of a network device to which an energy efficiency control policy can be applied. As illustrated in FIG. 1, network device 110 includes physical layer device (PHY) 112, media access control (MAC) 114, and host 116. In general, host 116 can comprise suitable logic, circuitry, and/or code that may enable operability and/or functionality of the five highest functional layers for data packets that are to be transmitted over the link. Since each layer in the OSI model provides a service to the immediately higher interfacing layer, MAC controller 114 can provide the necessary services to host 116 to ensure that packets are suitably formatted and communicated to PHY 112. MAC controller 114 can comprise suitable logic, circuitry, and/or code that may enable handling of data link layer (Layer 2) operability and/or functionality. MAC controller 114 can be configured to implement Ethernet protocols, such as those based on the IEEE 802.3 standard, for example. PHY 112 can be configured to handle physical layer requirements, which include, but are not limited to, packetization, data transfer and serialization/deserialization (SERDES).

In general, controlling the data rate of the link may enable the network device and possibly its link partner to communicate in a more energy efficient manner. More specifically, a reduction in link rate to a sub-rate of the main rate enables a reduction in power, thereby leading to power savings. In one example, this sub-rate can be a zero rate, which produces maximum power savings.

One example of subrating is through the use of a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate (e.g., turning off three of four channels). In another embodiment, the subset PHY technique can be enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted.

Another example of subrating is through the use of a low power idle (LPI) technique. In general, LPI relies on entering a quiet state where power savings can be achieved when there is nothing to transmit. Power is thereby saved when the link is off. Refresh signals can be sent periodically to enable wake up from the sleep mode.

In general, both the subset and LPI techniques involve turning off or otherwise modifying portions of the PHY during a period of low link utilization. As in the PHY, power savings in the higher layers (e.g., MAC) can also be achieved by using various forms of subrating as well.

As FIG. 1 illustrates, network device 110 also includes energy efficiency control policy entity 118. In general, energy efficiency control policy entity 118 can be designed to determine when to enter an energy saving state, what energy saving state (i.e., level of energy savings) to enter, how long to remain in that energy saving state, what energy saving state to transition to out of the previous energy saving state, etc.

Figure 2:
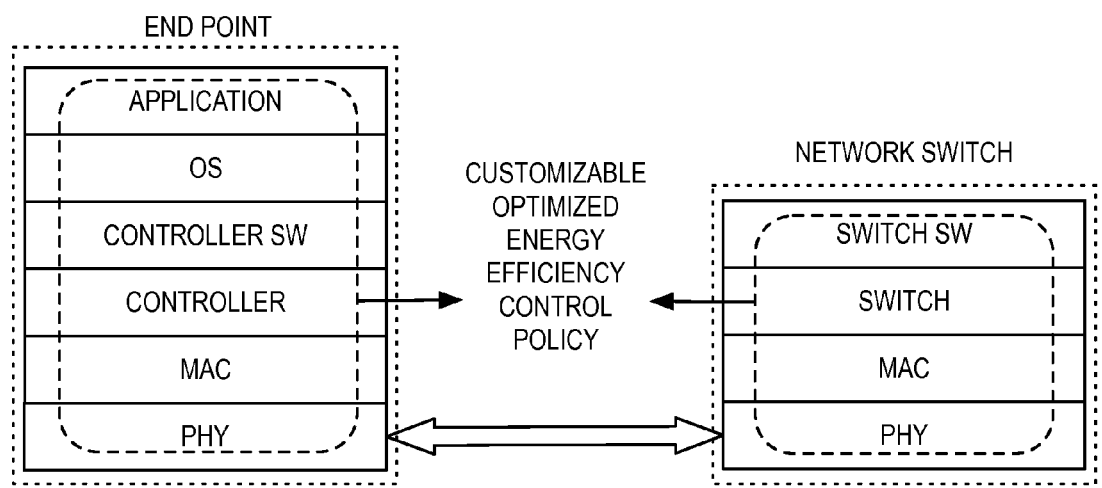
FIG. 2 illustrates an example of an energy efficiency control policy in a protocol stack.

Energy efficiency control policy entity 118 in network device 110 includes software code that can interoperate with various layers, including portions of the PHY, MAC, switch, or other subsystems in the host. Energy efficiency control policy entity 118 can be enabled to analyze traffic on the physical link and to analyze operations and/or processing of data in itself or in its link partner. In this manner, energy efficiency control policy entity 118 can exchange information from, or pertaining to, one or more layers of the OSI hierarchy in order to establish and/or implement the energy efficiency control policy. FIG. 2 illustrates an example of an energy efficiency control policy, which can touch various layers on both ends (e.g., controller and network switch) of the link to produce a customizable and optimized control policy.

In producing energy savings, an energy efficiency control policy can effect intelligent decision making based on energy efficiency control policy settings, parameters and configurations that are established by a user (e.g., system administrator). For example, the user can establish empty or non-empty conditions of ports, queues, buffers, etc. to determine whether to transition to or from an energy saving state. The user can also establish various timers that can govern the determination of when to transition between various defined energy saving states.

As would be appreciated, the effectiveness of an energy efficiency control policy is dependent on the proper configuration of the energy efficiency control policy to a particular network device and traffic profile. Such configuration is necessarily complex as the user must decide how best to deploy the energy-saving capabilities of a given network device to a particular installation environment.

In the present invention, it is recognized that the customization of the energy efficiency control policy is typically beyond the capacity of a typical user, as many of the energy efficiency control policy settings (e.g., timer values, queue/buffer levels, etc.) are at a low level in the hardware/software stack. Such being the case, the user's unfamiliarity with such parameter settings can lead to mis-configuration, which can therefore hinder the effectiveness of the energy efficiency control policy in producing energy savings.

It is therefore a feature of the present invention that an interface can be provided that can enable user-customization of an energy efficiency control policy without relying on a highly granular user interaction with the low-level, control-policy details. In one embodiment, such a result is achieved through an abstraction of the customization process that is facilitated by a graphical user interface, which is designed to identify user preferences for energy savings.

Figure 3:
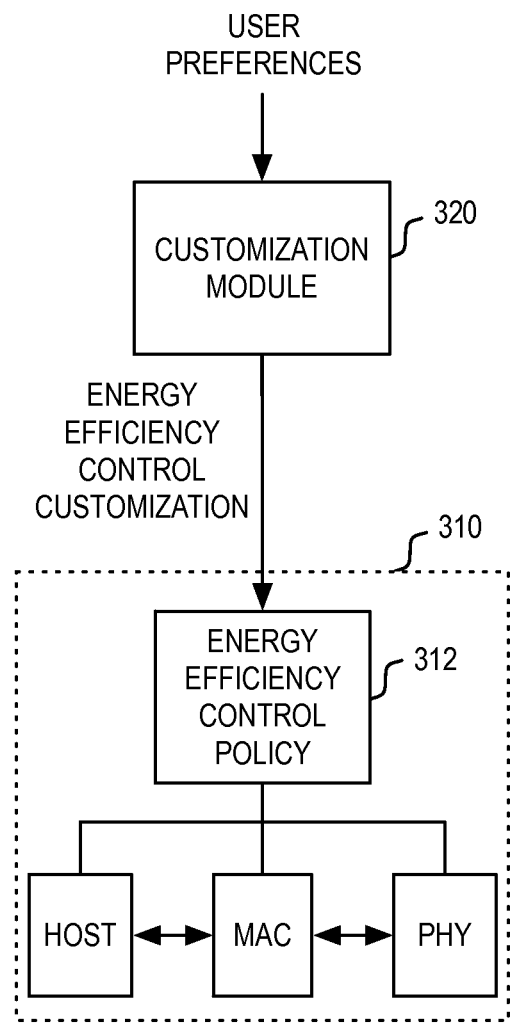
FIG. 3 illustrates an example of energy efficiency control customization according the present invention.

FIG. 3 illustrates an example embodiment that enables customization of an energy efficiency control policy according to the present invention. As illustrated, network device 310 includes energy efficiency control policy 312. Energy efficiency control policy 312 can be designed to receive energy efficiency control customizations that are generated by customization module 320.

In one embodiment, customization module 320 is a software-based module that interfaces with a user through a graphical user interface. In this example embodiment, the graphical user interface is designed to receive as input, indications of user preferences from the user. Here, it is significant that the user preferences can be used by customization module 320 in identifying particular parameters of energy efficiency control policy 312, without requiring the user to specify such parameters explicitly. As would be appreciated, the particular indications of user preferences would be implementation dependent.

In one simple example, the user can be prompted by the graphical user interface for a preference regarding a level of aggressiveness (e.g., low, medium, high) of the energy efficiency control policy in generating energy savings. In another example, the user can be prompted with a series of questions that are designed to extract energy savings preferences from a user. In one application, a series of questions can be used as part of a conjoint analysis that presents the user with a series of trade-offs that reveal the relative importance of energy efficiency control policy attributes. The rankings produced by these tradeoffs can then be used to infer preferences by the user without the explicit designation of such preferences by the user.

In the present invention, it is recognized that the extraction of preferences by the user is often the extent to which the user can properly understand the potential customization of the energy efficiency control policy. As such, customization module 320 can be designed to translate the indications of user preference into energy efficiency control customizations that are provided to energy efficiency control policy 312. In one embodiment, the energy efficiency control customization can include specific parameters (e.g., timer values, queue/buffer levels, etc.) that are used to configure energy efficiency control policy 312. In another embodiment, the energy efficiency control customization can include an identification of one of a plurality of available energy efficiency operating modes that are supported by network device 310. Here, it should be noted that the abstraction of the customization of energy efficiency control policy can insulate the user from the variances in energy efficiency capabilities supported by different network devices.

As noted, customization module 320 is designed to translate indications of user preferences into energy efficiency control customizations. In one embodiment, this translation can be based on a database of energy efficiency control customizations that are correlated to indications of user preference. Of course, the particular mechanism of translating indications of user preferences to energy efficiency control customizations would be implementation dependent without departing from the scope of the present invention.

In the example embodiment of FIG. 3, customization module 320 is illustrated as being separate from network device 310. This embodiment can be useful in a context where a separate computing device (e.g., network administrator's workstation) was used to derive energy efficiency control customizations that are subsequently transferred to the network device. As would be appreciated, the transfer of energy efficiency control customizations can be direct or through an intermediary device (e.g., profile database) that can facilitate the energy efficiency control customization of the network device.

In one embodiment, customization module can be included in the network device itself. Here, the network device can be a relatively sophisticated device that can present an interface (e.g., web interface) to a user. Through the web interface, the user can provide indications of user preferences that can then be translated by the network device itself into energy efficiency control customizations.

As noted with respect to FIG. 2, the customization of an energy efficiency control policy can be performed across a network link in touching various layers on both ends. In the present invention, it is recognized that typical customizations of an energy efficiency control policy are limited to impacting the responsiveness of the energy efficiency control policy to existing network conditions. As such, the typical customization of the energy efficiency control policy is not designed to change the network conditions.

In the present invention, it is recognized that one of the significant impediments to an energy efficiency control policy's ability to generate energy savings is the existence of intermittent, low-bandwidth traffic on a link. Often, this intermittent low-bandwidth traffic can be generated by messaging protocols (Layer 2 or higher) that can "discover" the network, perform synchronization across the network, etc. Various examples of such messaging protocols exist, including Link Layer Discovery Protocol (LLDP)/Cisco Discovery Protocol (CDP), Open Shortest Path First (OSPF) Hello, Link Aggregation Control Protocol (LACP), Bidirectional Forwarding Detection (BFD), Spanning Tree, timing and synchronization (IEEE 802.1AS) for audio-video bridging (AVB), etc. To illustrate the features of the present invention, the messaging protocol used for timing and synchronization in AVB is used as an example. As would be appreciated, however, the principles of the present invention are not limited by such an example.

In general, AVB devices periodically exchange timing information that allows both ends of the link to synchronize their time base reference clock very precisely. In IEEE 802.1AS, a single AVB device provides a master timing signal, to which the other AVB devices will synchronize their clocks. Synchronization of the clocks is enabled by a synchronization message that is typically sent every 125 ms.

In the context of producing energy savings, the periodic transmission of such synchronization messages every 125 ms on a network link, can severely compromise the energy efficiency control policy in generating energy savings. This can occur, for example, where the continued existence of low-bandwidth message traffic prevents the energy efficiency control policy from identifying the network link as being in an inactive state.

In the present invention, customization of an energy efficiency control policy can also be used to alter the network conditions experienced on the link. This can be accomplished, for example, through a modification of a messaging protocol by the energy efficiency control policy. Using the AVB example above, the energy efficiency control policy can be designed to alert a link partner that the frequency of such synchronization messages should be relaxed from once every ⅛ sec to once every 5 sec, 10 sec, etc., such that the energy efficiency control policy can have an opportunity to pursue energy savings.

As would be appreciated, the adjustment of a messaging protocol by the energy efficiency control policy can be dictated by the indications of user preference received by the customization module. If the user preferences identify aggressive energy savings, then messaging protocols can be adjusted significantly. If, on the other hand, the user preferences identify low energy savings and high network performance, then the messaging protocols can be left unmodified.

As has been described, the energy efficiency control policy can be used to impact messaging protocols in accordance with indications of user preferences. The example provided above in the context of AVB is not intended to be limiting. Any messaging protocol that is designed to produce intermittent message traffic can be adjusted. Moreover, the particular adjustment mechanism would be implementation dependent. In the example above, the frequency of transmission was altered. In another example, a time-to-live field in the message can be adjusted to prevent messages from continuing to circulate through the network. As would be appreciated, any mechanism that produces a further restriction on the initial or subsequent transmission of protocol message traffic can be used to adjust a messaging protocol to increase the chances of energy savings through a reduction in a level of packet exchange.

Additionally, it should be noted that the adjustments to messaging protocols need not be confined to a particular port. For example, all ports on a device (e.g., switch) can be impacted, whether or not the impacted ports are all configured to produce energy savings. Here, the energy efficiency control policy can be designed to affect a broader level of network performance beyond a single link by reducing low-bandwidth message traffic that can stand in opposition to energy savings efforts at a broader network level.

Figure 4:
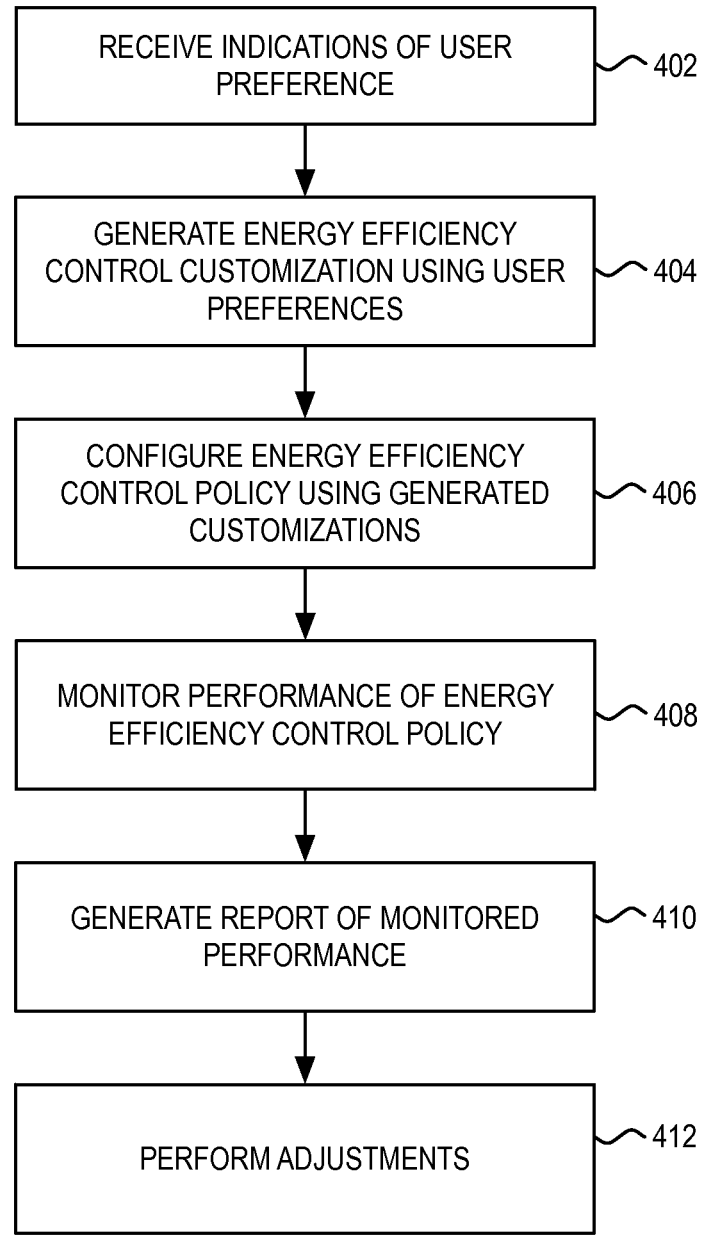
FIG. 4 illustrates a flowchart of a process of the present invention.

In general, an effective energy efficiency control policy is dependent on low-level details, many of which would be outside the scope of the user's competence. This is especially true when considering the impact of an energy efficiency control policy in adjusting one or more messaging protocols that can exist on the network link. In the present invention, customization of the energy efficiency control policy can also be based on feedback that is generated as part of an analysis of a performance of an energy efficiency control policy to actual network conditions. To illustrate such an embodiment, reference is now made to FIG. 4, which illustrates a flowchart of a process of adjusting an energy efficiency control policy.

As illustrated, the process begins at step 402 where indications of user preference are received. As noted above, the indications of user preference can be received in a graphical user interface. This graphical user interface can be generated by the network device itself or by a second device separate from the network device.

Next, at step 404, energy efficiency control customizations are generated by a customization module using the identified user preferences. The customizations generated by the customization module are used to establish parameters of operation (e.g., timer values, queue/buffer levels, etc.) for the energy efficiency control policy. Here, it is significant that the parameters of operation are established without direct specification by the user. Rather, the parameters of operation are established using preferences indicated by the user. This provides an abstraction for the user of the energy efficiency control policy customization process. Once the parameters are established, the energy efficiency control policy can be configured using the generated customizations at step 406.

At this point, the operation of the configured energy efficiency control policy can be monitored at step 408 during actual operation of the network device in a live-traffic setting. In general, the monitoring of the performance of the configured energy efficiency control policy can be used to further customize the energy efficiency control policy in responding to the needs of a particular installation. For example, the performance of the configured energy efficiency control policy can be monitored by identifying the energy savings produced in response to traffic of all protocols received on the network link. Here, for example, it is recognized that the existence of particular forms of "chatty" traffic on the network link can have a negative impact on the energy efficiency control policy.

To meet the needs of a particular network link, a report is then generated at step 410 that identifies configuration parameters that may be changed in the energy efficiency control policy itself, or in messaging protocols that are impacting the energy efficiency control policy. Based on such a generated report, the user can choose at step 412 to follow the report recommendations in making further customizations in accordance with the report's suggested remedies. These suggested customizations further enable the user's role in the configuration of the energy efficiency control policy to be abstracted from the low-level details of the energy efficiency control policy. In various embodiments, these customizations can be performed automatically are semi-automatically as would be apparent.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   configuring an energy efficiency control policy of a device;
   after said configuration, monitoring, by an energy efficiency controller in said device, traffic for one or more messaging protocols on a network link supported by said device;
   generating a report that enables a determination of an impact of said traffic by said one or more messaging protocols on an efficiency of operation of said configured energy efficiency control policy in producing energy savings for said device; and
   modifying a parameter of operation of one of said one or more messaging protocols in response to said generated report, wherein said modification results in lowering messaging traffic produced by said one of said one or more messaging protocols.

2. The method of claim 1, wherein said modification enables a reduction in a frequency of messaging traffic by said one of said one or more messaging protocols.

3. The method of claim 1, wherein said modification enables a change in a time to live field in messages produced by said one of said one or more messaging protocols.

4. The method of claim 1, further comprising alerting, by said device, a peer device of said modification to said parameter of operation of said one of said one or more messaging protocols.

5. The method of claim 1, wherein said configuring comprises configuring based on a received indication of a desired level of aggressiveness for said energy efficiency control policy.

6. The method of claim 1, wherein said configuring comprises configuring based on a received indication of a desired level of application performance.

7. A device, comprising:
   a physical layer device that is configured to communicate with a link partner device via a network link, said physical layer device being further configured to switch between an active state and an energy saving state; and
   an energy efficiency controller that is configured to control a switching of the physical layer device between said active state and said energy saving state, said control being performed in accordance with an energy efficiency control policy, said energy efficiency controller further configured to monitor traffic for one or more messaging protocols on said network link, to generate a report that enables a determination of an impact of said traffic on an efficiency of operation of said energy efficiency control policy in producing energy savings for said device and to modify a parameter of operation of one of said one or more of messaging protocols in response to said generated report, wherein said modification results in lowering messaging traffic produced by said one of said one or more messaging protocols.

8. The device of claim 7, wherein said modification enables a reduction in a frequency of messaging traffic by said one of said one or more messaging protocols.

9. The device of claim 7, wherein said modification enables a change in a time to live field in messages produced by said one of said one or more messaging protocols.

10. The device of claim 7, wherein said energy efficiency controller is further configured to alert said link partner device of said modification to said parameter of operation of said one of said one or more messaging protocols.

11. The device of claim 7, wherein said energy efficiency controller is configured based on a received indication of a desired level of aggressiveness for said energy efficiency control policy.

12. The device of claim 7, wherein said energy efficiency controller is configured based on a received indication of a desired level of application performance.

13. A method, comprising:
   monitoring, by an energy efficiency controller in a device, traffic for one or more messaging protocols on a network link supported by said device;
   generating information that enables a determination of an impact of said traffic by said one or more messaging protocols on an efficiency of operation of a configured energy efficiency control policy in producing energy savings for said device; and
   modifying a parameter of operation of one of said one or more messaging protocols in response to said generated information, wherein said modification results in lowering messaging traffic produced by said one of said one or more messaging protocols.

14. The method of claim 13, wherein said modification enables a reduction in a frequency of messaging traffic by said one of said one or more messaging protocols.

15. The method of claim 13, wherein said modification enables a change in a time to live field in messages produced by said one of said one or more messaging protocols.

16. The method of claim 13, further comprising alerting, by said device, a peer device of said modification to said parameter of operation of said one of said one or more messaging protocols.

* * * * *

UNITED STATES PATENT AND TRADEMARK OFFICE
CERTIFICATE OF CORRECTION

| | | |
|---|---|---|
| PATENT NO. | : 8,812,884 B2 | Page 1 of 1 |
| APPLICATION NO. | : 13/336035 | |
| DATED | : August 19, 2014 | |
| INVENTOR(S) | : Diab et al. | |

It is certified that error appears in the above-identified patent and that said Letters Patent is hereby corrected as shown below:

In the Claims

Col. 8, line 30, replace "one or more of" with --one or more--.

Signed and Sealed this
Twenty-eighth Day of October, 2014

Michelle K. Lee
*Deputy Director of the United States Patent and Trademark Office*